Aug. 3, 1965   J. M. CULLINAN   3,198,144
COLLAPSIBLE TABLE
Filed Nov. 14, 1962   2 Sheets-Sheet 1

INVENTOR.
JOSEPH M. CULLINAN

Aug. 3, 1965    J. M. CULLINAN    3,198,144
COLLAPSIBLE TABLE

Filed Nov. 14, 1962    2 Sheets-Sheet 2

INVENTOR.
JOSEPH M. CULLINAN

United States Patent Office 3,198,144
Patented Aug. 3, 1965

3,198,144
COLLAPSIBLE TABLE
Joseph M. Cullinan, 1212 Tower Drive, Vista, Calif.
Filed Nov. 14, 1962, Ser. No. 237,569
1 Claim. (Cl. 108—48)

This invention relates to a collapsible table and more particularly to a collapsible table for use by the driver or passengers within an automobile. More specifically the invention relates to a collapsible table for use within an automobile which is easily and conveniently removable.

According to the invention a pedestal member which can be constructed of wood fibre glass or other light material such as cast aluminum is pivotally mounted, for example by a hinge, to the floor of an automobile directly under the front portion of one of the seats. The pedestal member can be adjustable in length to accommodate various seating and floor board arrangements. In one embodiment the top of the pedestal is preferably a straight horizontal edge having mounted thereon one section of a hinge with a fixed hinge pin in cooperation therewith mounted between each member of the hinge bracket. A cooperating desk member, i.e. another flat sheet, to be utilized as a desk top, has a cooperating hinge bracket, which when tilted with the edge meeting the pedestal member downward, will slip around the fixed hinge pin on the pedestal member and the back end or opposite end of the desk member edge can then be rotated down toward the seat portion of the automobile locking the two hinge brackets together and forming a stop between the rear side of the pedestal member and the front edge of the hinge bracket on the bottom forward edge of the desk bracket. When not in use it merely becomes necessary to rotate the desk portion by lifting the back of it up until the hinge members are no longer in a self-locking position and pulling upward and backward on the desk portion for easy removal thereof. The pedestal at this point is merely pivoted forward on its hinge, and will conveniently lie on the floor board of the automobile. Another embodiment utilizes a slot built into either the desk or pedestal member and a matching insert as a part of the other member. Thus, the desk member can be easily lifted off the pedestal member. Rugged construction of the pedestal member will allow it to act as a floor board when not in use as the desk pedestal. The weight of the desk member when coupled to the pedestal member will hold the pedestal member in an upright position leaning against the front or forward edge of whichever seat it is mounted in proximity to.

Rugged construction of the pedestal member will allow it to act as a floor board when not in use as the desk pedestal. The weight of the desk member when coupled to the pedestal member will hold the pedestal member in an upright position leaning against the front or forward edge of whichever seat it is mounted in proximity to.

It is thus an object of the present invention to provide a collapsible table which can easily be used by the driver or passengers of an automobile and which includes a top and pedestal that can be quickly moved to a stored position.

A further object of the invention is to provide a collapsible table with a removable desk member which is self-locking when in use and easily removed when not in use leaving a pedestal member which can be permanently mounted to the floor of an automobile and utilized as a floor board when not in use.

A still further object of the present invention is to provide an improved collapsible table for use in automobiles which is inexpensive, durable, easy to install, and adjustable in height for a universal fit.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
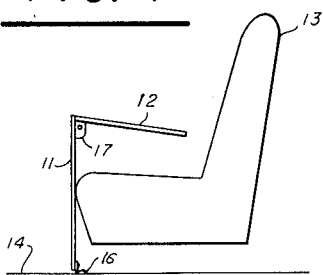
FIG. 1 is a side view of one embodiment of the present invention utilized in conjunction with an automobile seat.

Referring to the drawings and more particularly to FIG. 1, there is shown a pedestal member 11 attached to desk member 12. These two members bracket an automobile seat shown at 13. Pedestal member 11 is mounted on floor 14 by hinge 16. Desk member 12 is mounted on pedestal member 11 by hinge 17.

Figure 2:
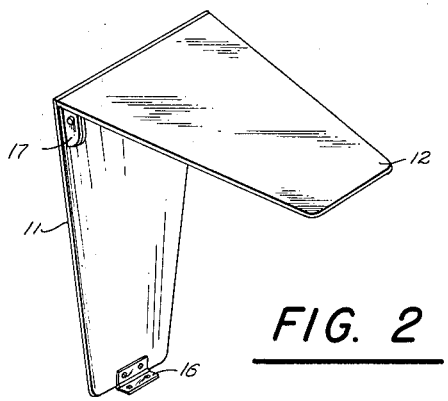
FIG. 2 is a perspective view of the embodiment of FIG. 1 in its normal use position.

Referring now to FIG. 2 the invention is shown in perspective without seat 13. Again pedestal 11 is shown mounted by hinge 16 and coupled to desk member 12 by hinge 17.

Figure 3:
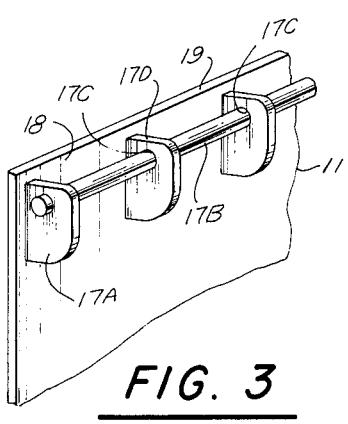
FIG. 3 is a detail of the hinge brackets and hinge pin mounted on the top of the pedestal of the embodiment of FIG. 1.

Referring to FIG. 3 there is shown the top portion of pedestal 11 having mounted thereon a plurality of hinge brackets 17a having hinge pin 17b carried through apertures 17c within hinge brackets 17a. Pedestal member 11 has back surface 18 and top surface 19. Hinge brackets 17a are either integral with pedestal member 11 or are mounted against back surface 18 of pedestal 11. Top surface 17d of hinge brackets 17 are below top surface 19 of pedestal member 11.

Figure 4:
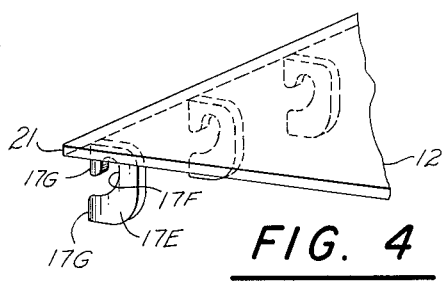
FIG. 4 is a detail in perspective of a portion of the hinge bracket mounted on the desk member of the invention for cooperation with the hinge bracket of FIG. 3.

Referring to FIG. 4 there is shown a portion of desk member 12 having hinge brackets 17e with recess 17f for cooperating with hinge pin 17b of FIG. 3. Front surface 17g of hinge brackets 17e are flush with front surface 21 of desk 12 when desk 12 is in use. Again, hinge brackets 17e may be integral with desk 12 or may be mounted thereon in any conventional manner.

Figure 5:
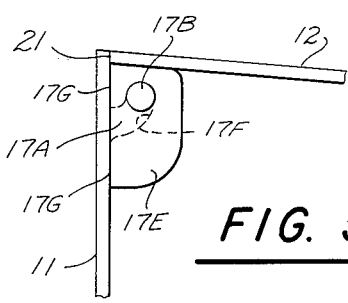
FIG. 5 is a detail of a part of FIG. 1 showing the hinge bracket mounting of the desk member on the pedestal.

Referring to FIG. 5 there is shown the cooperating hinge brackets of pedestal member 11 and desk member 12 when in the use position. Hinge bracket 17a attached to pedestal member 11 is shown in solid lines and hinge bracket 17e attached to desk member 12 is shown in dotted lines. Hinge pin 17b is shown within recess 17f of hinge bracket 17e. Front surface 21 is of desk member 12 is shown flush with back surface 18 of pedestal member 11.

Figure 6:
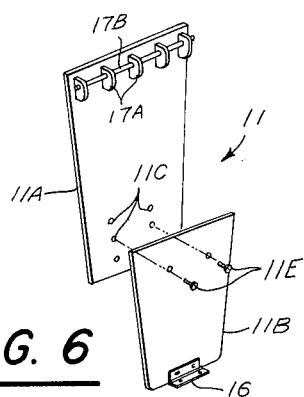
FIG. 6 is a detail of a further modification to the pedestal.

Referring to FIG. 6 there is shown pedestal member 11 consisting of two parts 11a and 11b. Member 11b has a plurality of threaded bores shown at 11c, and member 11a has a plurality of bores shown at 11d. Screws 11e are threadably engaged in bores 11c.

Figure 7:
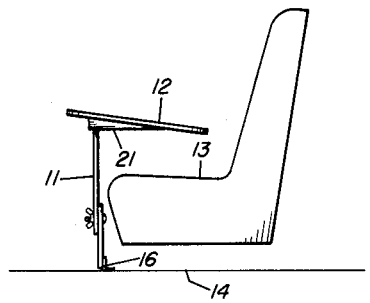
FIG. 7 is a side view of another embodiment of the present invention utilized in conjunction with an automobile seat.

Referring to FIG. 7, as in FIG. 1, there is again shown pedestal member 11 attached to desk member 12. These two members bracket an automobile seat 13. Pedestal member 11 is mounted on floor 14 by hinge 16. Desk member 12 is mounted on pedestal member 11 by slot 21.

Figure 8:
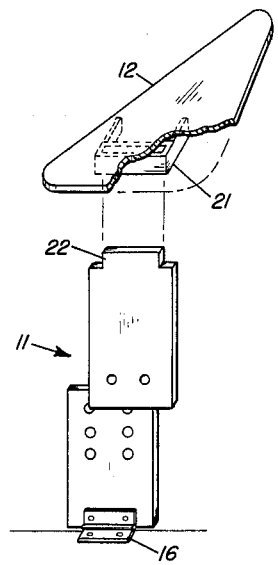
FIG. 8 is an exploded and partially broken away perspective view of the embodiment of FIG. 7.

Referring to FIG. 8, slot 21 is shown in desk member 12. Insert 22 of pedestal member 11 matches slot 21 for a snug fit therein.

Figure 9:
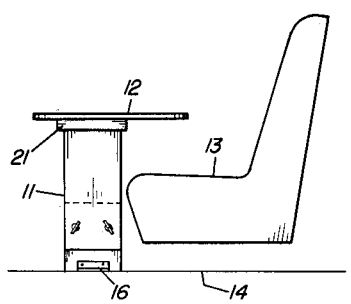
FIG. 9 is a side view of still another embodiment of the present invention utilized in conjunction with an automobile seat.

FIG. 9 is identical to FIG. 7 except for the placement of hinge 16 and corresponding placement change of slot 21.

Figure 10:
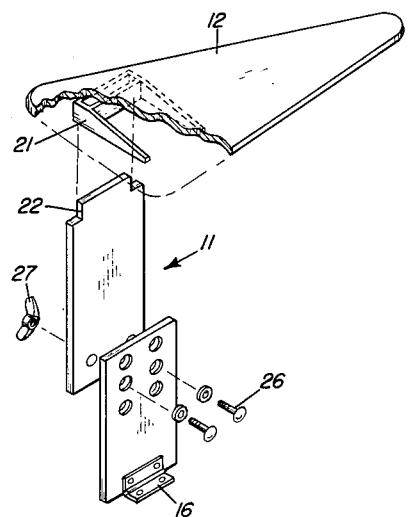
FIG. 10 is an exploded and partially broken away perspective view of the embodiment of FIG. 9.

FIG. 10 illustrates the same alternative arrangement with respect to FIG. 8. Bolts 26, having wing nuts 27, are also shown in place of the threaded bores 11c of FIG. 6.

Figure 11:
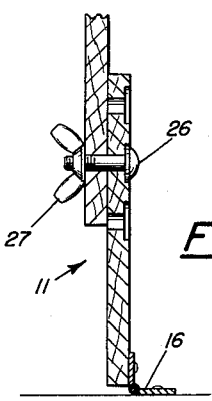
FIG. 11 is a detail of another modification to the pedestal.

FIG. 11 shows a detail of bolts 26 and wing nuts 27 utilized in bores 28 of pedestal member 11 for adjusting the height thereof.

*Operation*

Referring now to FIGS. 1-6 collectively it can be seen that in operation pedestal 11 is pivoted towards and against the front (in the case of an automobile mounting) of automobile seat 13 at which time the desk member 12 is tilted with the hinge bracket or front edge downward to facilitate the reception of bar 17b, which is attached to the hinge brackets 17a, into recess 17f of hinge brackets 17e. When this is accomplished the desk is then rotated downward utilizing bar or hinge pin 17b as its pivot point until the front surface 17g of hinge bracket 17e is flush against the back surface 18 of pedestal member 11. At this time desk member 12 can no longer be rotated and hinge pin 17b is snugly against the top of recess 17f of hinge bracket 17e. The weight of the desk member 12 will hold it in a locked position coupling it to pedestal member 11, as well as pulling pedestal member 11 back against the front portion of seat 13 and keeping the entire assembly in place for operation. In the case of an automobile installation a simple stop member could be supplied in front of pedestal member 11 (not shown) to keep the assembly from falling forward when deccelerating the automobile. This is not illustrated since it does not form a part of the present invention.

Another patentable feature of the invention is illustrated in FIG. 6, for adjusting the height of pedestal member 11 to accommodate various automobile seat heights and allow for the presence or absence of a raised tunnel on the floor of an automobile. As illustrated the pedestal member is at its medium height. To lower or raise the desk member, mounting screws 11e would be removed and the assembly pulled out or pushed together, as the case may be, until a new pair of threaded bores 11c are opposite bores 11d. At that time screw 11e are inserted through bores 11d and engaged threadably with the new set of threaded bores 11c. In the alternative wing nuts can be provided when wooden construction is utilized, for example as illustrated in FIG. 11.

It will be appreciated that when the collapsible table is not needed it can be removed by simply rotating the desk member 12 upward and backward and pushing pedestal member 11 forward. In the case of an automobile the desk member can then be set in the back seat or against the back of the front seat of the automobile, if space permits, a holding bracket on one door could be provided for storing desk member 12. Pedestal member 11 is then merely pushed forward and lies on the floor board of the automobile. Present day construction techniques would allow pedestal member 11 to be utilized as a floor board when not in use.

The only difference in the operation of the previously described embodiment and the slot-type of coupling shown in FIGS. 7-10 lies in the absence of rotary motion required for installing and removal of the desk member in the latter case. The embodiments of FIGS. 7-10 are more practical when wooded construction is desired. The placement and direction of folding of pedestal member 11 as shown in FIGS. 7 and 8 and FIGS. 9 and 10 is a matter of choice dictated by environment.

Bolts 26 and wing nuts 27 in FIG. 11 are preferred in the case of wooden construction for obvious reasons.

Obviously many other modifications and variations of the present invention are possible in the light of the above teachings. It is therefore to be understood that within the scope of the appended claim the invention may be practiced otherwise than as specifically described.

What is claimed is:

A collapsible table for cooperation with a seat in an automobile comprising a pedestal member and a desk member, mounting means for pivotally mounting said pedestal member, coupling means for rotatably coupling said desk member to said pedestal member, said coupling means including first and second brackets mounted on said pedestal member and said desk member, respectively, said brackets cooperating to form a self-locking coupling at one rotation extreme and a removal coupling at a predetermined arc of rotation from said arc rotation extreme.

References Cited by the Examiner

UNITED STATES PATENTS

| | | | |
|---|---|---|---|
| 982,093 | 1/11 | Russ | 108—138 X |
| 1,273,397 | 7/18 | Neill | 108—152 X |
| 2,558,366 | 6/51 | Madlena | 108—47 |
| 2,635,680 | 4/53 | Zentmire | 108—45 X |

FRANK B. SHERRY, *Primary Examiner.*